E. YOUNG.
GASOLENE METER.
APPLICATION FILED NOV. 9, 1914.

1,148,943.

Patented Aug. 3, 1915.

WITNESSES
J. V. Phillips
Alan F. Garner,

INVENTOR
Earle Young
BY Munn & Co.
ATTORNEYS

UNITED STATES PATENT OFFICE.

EARLE YOUNG, OF SPOKANE, WASHINGTON.

GASOLENE-METER.

1,148,943.  Specification of Letters Patent.  Patented Aug. 3, 1915.

Application filed November 9, 1914. Serial No. 871,014.

*To all whom it may concern:*

Be it known that I, EARLE YOUNG, a subject of the King of Great Britain, residing at Spokane, in the county of Spokane and State of Washington, have invented certain new and useful Improvements in Gasolene-Meters, of which the following is a specification.

This invention relates to liquid meters, and more particularly to a meter for measuring the amount of gasolene consumed by an automobile or other gasolene engine.

One of the principal objects of the invention is to provide a meter adapted to be connected with a gasolene reservoir and the engine of a power plant, for measuring in units the amount of gasolene consumed by the engine.

Another object of the invention is to provide a meter having inlet and outlet valves, and having a single valve stem carrying the valves, means being provided adjacent each valve and operable by means of a float, for alternately closing and opening the valves as the barrel of the meter alternately fills and empties, whereby a registering device may be periodically operated for registering the number of times the barrel is filled.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1:
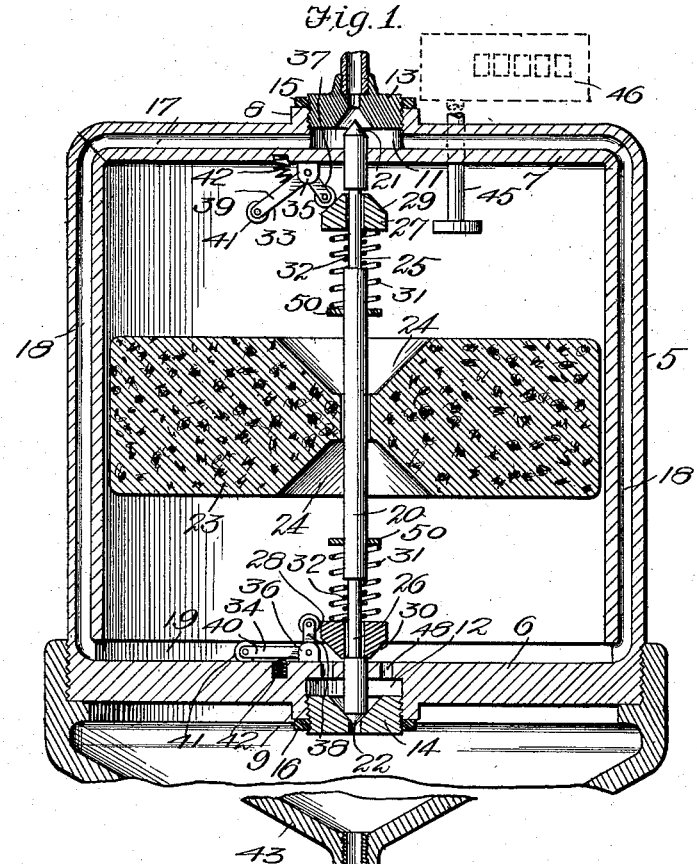
Figure 2:
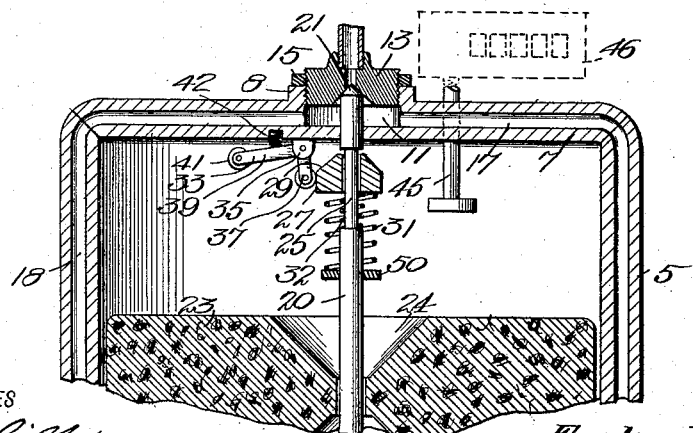

Figure 1 represents a vertical sectional view taken through a meter constructed according to my invention, and Fig. 2 represents a view similar to Fig. 1 of the upper portion of the meter, showing the position of the parts when the inlet valve is closed.

Referring more particularly to the drawing, the meter includes a chamber 5 in the form of a cylinder or barrel. A bottom 6 is preferably formed integrally with the chamber, and a top 7 is secured in any desirable manner on the chamber. The top and bottom are each provided centrally with nipples 8 and 9 respectively. The nipples are provided with threaded bores 11 and 12 respectively, into which the inlet and outlet valve seats 13 and 14 respectively, are threaded. The valve seats are locked in position by the rings 15 and 16 threaded upon the seats into engagement with the nipples. Seat 13 is provided with an interiorly threaded boss to which a pipe leading from a gasolene supply tank (not shown) is connected.

Top 7 is provided with radially extending bores 17 communicating at their inner ends with bore 11 below valve seat 13. The walls of the chamber 5 are also provided with bores 18, of a number equal to the number of bores 17, and when the top is in place each of the bores 17 is in communication with one of the bores 18. The latter at their lower ends communicate with the interior of the chamber through an annular channel 19 provided in the lower end of the chamber. By this means liquid entering through valve seat 13 finds its way into the chamber at the lower end thereof. Communication between the lower end of the chamber and bore 12 above the valve seat 14, is established through the perforations or openings 48 in the bottom 6 of the chamber. A valve stem 20 is disposed centrally and axially of the chamber, and slidably extends near its ends through top 7 and bottom 6 in alinement with the valve seats. The ends of the stem are conically ground to provide inlet and outlet needle valves 21 and 22 respectively. Valve stem 20 acts as a guide upon which a float 23 is slidably positioned in such manner as to move longitudinally of the chamber, as the level of the liquid therein rises and falls. The float is provided on both faces centrally thereof with conical depressions 24. The stem adjacent the needle valves is reduced as at 25 and 26 respectively, and on the reduced portions the circular blocks 27 and 28 respectively are slidably positioned. These blocks have their outer edges beveled as at 29 and 30. Each block is normally maintained against the base of the adjacent needle valve by means of a smaller coiled spring 32. The spring is disposed upon the reduced portion 25 between the block and the shoulder at the inner end of said reduced portion. An outer larger coiled spring 31 is disposed between each block and a collar 50 slidably positioned on the stem adjacent the block, one on each side of the float. Springs 31 are preferably connected to the blocks and rings, although this is not requisite to the operation of the device.

Blocks 27 and 28 form portions of trip mechanisms by means of which the valve stem and the needle valves are operated to alternately engage and disengage the valve seats. Said trip mechanisms also include the bell crank levers 33 and 34 disposed within the chamber and pivotally connected to the top and bottom respectively thereof, by means of the pairs of lugs or ears 35 and 36. The bell crank levers are arranged oppositely to each other, and in analogous relation with the blocks 27 and 28. The levers include respectively the inner shorter arms 37 and 38, and the outer longer arms 39 and 40. The arms of both levers are equipped at their extremities with rollers 41. By means of the coiled springs 42, the bell crank levers are normally maintained in such position that the shorter inner arms thereof lie in the path of the beveled surfaces of blocks 27 and 28.

A funnel shaped reservoir 43 is threaded onto the lower end of chamber 5, and connects with the carbureter (not shown) of an engine by means of a pipe 44. Gasolene or other liquid to be measured, passes into the reservoir through the outlet valve seat 14, when the outlet valve 22 is open. Slidably extending through the top 7, is a pin 45. Said pin is disposed in alinement with the float 23 and is connected with a registering apparatus, indicated in dotted lines at 46, and operates the latter when it is lifted by the float.

When the parts are in the position shown in Fig. 1, the inlet valve is open and the outlet valve closed, and the liquid may enter the chamber below the float, through the passages as described. As the float rises with the level of the liquid, upper collar 50 is engaged by said float, and is lifted against the tension of the coiled spring 31 which presses against the upper block 27. This block as illustrated is engaged by the shorter arm of lever 33 and is prevented from moving upwardly under tension of spring 31. As the float rises it engages the longer arm of lever 33 and trips said lever to move the same out of engagement with block 27, whereupon the latter is forced upwardly by action of spring 31, carrying the valve stem with it, thus instantly moving valve 21 against valve seat 13 and at the same time raising valve 22 out of engagement with valve seat 14. This movement carries block 28 upwardly with the valve stem so that the bell crank lever 34 may be actuated by its spring and moved until arm 38 is in engagement with block 28, and against the beveled portion of block 28. The block 28 is thus locked in upward position by the lever 34. The weight of the stem and the tension of coiled spring 32 operating block 28 are so adjusted that the spring will maintain the stem in raised position against the force of gravity. At approximately the same moment that the lever 33 is tripped, the float engages and raises the pin 45 so that the registering mechanism is operated. Thus should the chamber be designed to handle one-half pint of liquid the registering device would be actuated twice during the passage of a pint of liquid through the chamber.

The capacity of the chamber of course is optional, and may be designed to accommodate a pint, quart, gallon, etc., of liquid. When the lower valve 22 is raised the liquid passes into the reservoir 43 to be fed therefrom to the carbureter. As the chamber enpties the float moves downwardly with the level of the liquid, and when the chamber is finally emptied the lower trip mechanism is operated in the same manner as the upper mechanism so that the valve stem is actuated whereby to close the lower or outlet and open the upper or inlet valve. In this manner the alternate opening and closing of the valves is continued at the same time that the registering mechanism is operated, during the consumption of the liquid by the engine.

A meter constructed according to my invention will serve as means for registering the amount of gasolene that enters the carbureter, whereby the number of miles covered during the consumption of a given amount of fuel may be readily ascertained and whereby the most economical and efficient adjustment of the carbureter can be determined. Whether or not all the gasolene contained in the supply tank is being used, may also be readily determined by the use of this meter, so that leakage without the knowledge of the operator may be practically eliminated. It will also serve as means of discovering the presence of a dragging brake or other mechanical defects which decrease the speed or the mileage of an automobile, whose normal mileage for a given amount of fuel is known. By keeping record through the medium of the meter, short measure on the part of the gasolene dealers may be readily detected, and the unauthorized use of an automobile will make itself apparent.

Although I have described the preferred embodiment of my invention, I may desire to make such changes in the construction; combination and arrangement of parts thereof as do not depart from the spirit of the invention and the scope of the appended claims.

I claim:—

1. A meter including a chamber having an inlet and an outlet valve seat at its upper and lower ends respectively, a valve stem slidably positioned in the chamber in alinement with said valve seats, needle valves carried at the ends of the stem, trip mechanisms associated with the valve stem near each end thereof and adapted to alternately maintain the valves in seated position, a float slidably positioned upon said stem and adapted to alternately actuate said trip mechanisms for releasing the valves as the chamber alternately fills and empties, and a register operating pin adapted to be actuated by the float substantially simultaneously with the closing of one of the valves.

2. A meter including a chamber having inlet and outlet valve seats, a valve stem slidably positioned in the chamber in alinement with the seats, and having reduced portions near its ends, valves carried at the ends of said stem, a float slidably positioned on the stem within the chamber, a trip mechanism associated with each valve, said mechanisms each comprising a block slidably positioned on one of said reduced portions of the stem, springs for normally maintaining the block at the outer extremity of the reduced portion, a bell crank lever pivotally connected to the chamber adjacent the block, and means for maintaining the lever in such position that one arm thereof is in alinement with the block substantially as described.

3. A meter including a hollow chamber closed at one end, a cover for closing the opposite end of the chamber, an inlet valve mechanism associated with the cover, an outlet valve mechanism associated with the closed end of the chamber, said cover provided with bores extending from the inlet valve mechanism to the periphery of the cover, said chamber having its walls provided with bores communicating at one end with the bores in the cover and at the other end with the chamber near its closed end, and means for automatically operating the valve mechanisms whereby to admit, and allow the exit of, fluid relatively to the chamber.

4. A meter including a chamber having an inlet and an outlet valve seat, a valve stem positioned in the chamber, said stem slidably guided in alinement with the valve seats through openings in the walls of the chamber adjacent said seats, valves carried by the stem and adapted to co-act with said valve seats, a trip mechanism associated with each valve and adapted to alternately control the operation of the stem and valves, means for alternately tripping said trip mechanisms as the chamber fills and empties, for alternately closing and opening the valves, a registering device and means associated with the chamber and adapted to operate the registering device upon closing movement of one of said valves.

5. A meter comprising a chamber, an inlet and an outlet valve mechanism associated with the chamber at opposite ends thereof, a trip mechanism associated with each valve mechanism, spring controlled blocks for alternately operating said trip mechanisms whereby to alternately close or open the valves as the chamber alternately fills and empties, and means for alternately actuating said blocks.

6. A meter including a chamber, a valve stem slidably positioned therein, a float disposed within the chamber and slidable on the stem, valve mechanisms operable by the stem for alternately allowing entrance of fluid to the chamber and exit of the fluid from the chamber, means operable by the float to alternately operate the valve stem, said means including spring controlled blocks slidably disposed on the stem, and means operable by the float for actuating a registering mechanism upon alternate actuations of the valve stem.

7. A meter including a chamber, inlet and outlet valve mechanism associated therewith, a valve stem for simultaneously actuating the valve mechanisms whereby to allow entrance of or exit of fluid relatively to said chamber, trip mechanisms for controlling the valve mechanisms, means for alternately operating the trip mechanisms upon filling and emptying of the chamber, and means operable substantially simultaneously with one of the trip mechanisms whereby to operate a registering mechanism.

EARLE YOUNG.

Witnesses:
E. L. COLBY,
C. C. LANTRY.

Copies of this patent may be obtained for five cents each, by addressing the "Commissioner of Patents, Washington, D. C."